(12) United States Patent
Wöppermann et al.

(10) Patent No.: US 12,009,728 B2
(45) Date of Patent: Jun. 11, 2024

(54) GEAR MOTOR HAVING A GEARING SYSTEM, AN ELECTRIC MOTOR, AND AN ADAPTER

(71) Applicant: SEW-EURODRIVE GMBH & CO. KG, Bruchsal (DE)

(72) Inventors: Markus Wöppermann, Karlsbad (DE); Jens Schillinger, Rastatt (DE); Stefan Hannet, Schwetzingen (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 301 days.

(21) Appl. No.: 17/618,673

(22) PCT Filed: Jun. 3, 2020

(86) PCT No.: PCT/EP2020/025258
§ 371 (c)(1),
(2) Date: Dec. 13, 2021

(87) PCT Pub. No.: WO2020/249255
PCT Pub. Date: Dec. 17, 2020

(65) Prior Publication Data
US 2022/0247267 A1 Aug. 4, 2022

(30) Foreign Application Priority Data

Jun. 11, 2019 (DE) ............ 102019004056.2

(51) Int. Cl.
*H02K 7/116* (2006.01)
*H02K 7/00* (2006.01)
*F16D 1/08* (2006.01)

(52) U.S. Cl.
CPC ............ *H02K 7/116* (2013.01); *H02K 7/003* (2013.01); *F16D 1/0847* (2013.01); *F16D 1/0864* (2013.01); *F16D 2300/08* (2013.01)

(58) Field of Classification Search
CPC ...... H02K 7/003; H02K 7/116; F16D 1/0847; F16D 1/0864; F16D 2300/08
See application file for complete search history.

(56) References Cited

U.S. PATENT DOCUMENTS

| 7,192,355 B2 | 3/2007 | Bayer et al. |
| 2006/0188326 A1* | 8/2006 | Bayer ............... F16D 3/06 |
| | | 403/321 |

(Continued)

FOREIGN PATENT DOCUMENTS

| CN | 1754298 A | 3/2006 |
| CN | 1824963 A | 8/2006 |

(Continued)

OTHER PUBLICATIONS

International Preliminary Report on Patentability issued in corresponding International Application No. PCT/EP2020/025258 dated Dec. 14, 2021, pp. 1-9.

(Continued)

*Primary Examiner* — Jue Zhang
(74) *Attorney, Agent, or Firm* — Carter, DeLuca & Farrell LLP

(57) ABSTRACT

A gear motor includes a gearing system, an electric motor, and an adapter. The adapter is situated between the electric motor and the gearing system, the adapter has an adapter shaft, the adapter shaft is at least partially inserted into an input shaft of the gearing system, the adapter shaft is connected to the input shaft in a torsionally fixed manner with the aid of a bellows, and a sealing ring is situated between the adapter shaft and the input shaft.

23 Claims, 3 Drawing Sheets

(56) References Cited

U.S. PATENT DOCUMENTS

| | | | |
|---|---|---|---|
| 2006/0194666 A1* | 8/2006 | Zimmermann | F16H 1/125 74/421 A |
| 2010/0104358 A1* | 4/2010 | Lang | F16D 1/04 403/344 |
| 2021/0218314 A1 | 7/2021 | Woppermann et al. | |

FOREIGN PATENT DOCUMENTS

| | | |
|---|---|---|
| CN | 109243757 A | 1/2019 |
| DE | 3543915 A1 | 6/1986 |
| DE | 19846235 C1 | 1/2001 |
| DE | 10118562 A1 | 10/2002 |
| DE | 10312941 A1 | 12/2004 |
| DE | 102013011900 A1 | 1/2015 |
| EP | 1696145 A2 | 8/2006 |
| WO | 2019214845 A1 | 11/2019 |

OTHER PUBLICATIONS

International Search Report issued in corresponding International Application No. PCT/EP2020/025258 dated Aug. 19, 2020, pp. 1-3, English Translation.

Chinese Office Action issued in corresponding CN Patent Application No. 202080042442.6, dated Oct. 13, 2023, together with English translation.

* cited by examiner

GEAR MOTOR HAVING A GEARING SYSTEM, AN ELECTRIC MOTOR, AND AN ADAPTER

FIELD OF THE INVENTION

The present invention relates to a gear motor having a gearing system, an electric motor, and an adapter.

BACKGROUND INFORMATION

In certain conventional systems, a gear motor includes a gearing system, an electric motor, and an adapter exposed to variable temperatures when in operation.

German Patent Document No. 103 12 941 describes a metal bellows as a coupling in a gear motor.

SUMMARY

Example embodiments of the present invention provide a gear motor in which the load to be driven by the gear motor is driven in the same manner at all times even when the temperatures fluctuate.

According to an example embodiment of the present invention, a gear motor includes a gearing system, an electric motor, and an adapter. The adapter is situated between the electric motor and the gearing system, the adapter has an adapter shaft, the adapter shaft is at least partially inserted into the input shaft of the gearing system, the adapter shaft is connected to the input shaft with the aid of a bellows in a torsionally fixed manner, and a sealing ring is situated between the adapter shaft and the input shaft.

This has the advantage that the input shaft is rotatably mounted in the housing of the gearing system, e.g., using only a single bearing, and the sealing ring assumes a centering function for centering the input shaft relative to the adapter shaft. A motor shaft, e.g., a rotor, of the electric motor is connected to the adapter shaft in a friction-locked manner. A sun gear of a planetary gear stage of the gearing system is able to be positioned at the end of the input shaft facing away from the adapter shaft, the sun gear meshing with planet wheels and thus being supported. When the adapter shaft is inserted into the input shaft, it is centered with the aid of the sealing ring. After the friction-locked connection of the motor shaft to the adapter shaft, the elastic sealing ring compensates for alignment deviations of the shafts.

Since the input shaft has a hollow configuration and no additional sealing measures for escaping oil are provided in the insertion connection of the sun gear, the sealing ring represents a second level of protection with regard to oil tightness in the event of a failing insertion connection.

Thermally induced changes in length of the motor shaft are absorbed by the bellows, which is stiffer in the circumferential direction than in the axial direction. Thus, if the bellows is compressed or stretched in the axial direction, torque generated by the motor is still transmitted without interruption in the circumferential direction. In other words, even if the sun gear and the planet wheels have a helical gearing, the change in length of the motor shaft has no effect on the circumferential angular position of the output gear shaft because a change in length is already compensated before reaching the sun gear.

The sealing ring is, for example, arranged as an O-ring. More specifically, it can be produced from an elastic material such as rubber or other elastomer.

According to example embodiments, the adapter shaft has a step at its outer circumference, the input shaft has a stepped bore, and the sealing ring is situated axially between the step and the step of the stepped bore. The sealing ring, for example, is placed on the adapter shaft. For example, the region covered by the sealing ring in the axial direction, i.e., in the direction of the axis of rotation of the input shaft, is encompassed by the region covered by the bellows in the axial direction. This offers the advantage that the stepped bore and the step at the outer circumference are readily produced so that the spatial region for the accommodation of the sealing ring can be readily provided. In addition, the dimensioning of the steps makes it possible to select the spatial region so small that the sealing ring virtually fills the spatial region.

According to example embodiments, the adapter shaft has a hollow configuration, a motor shaft, e.g., a rotor, of the electric motor is at least partially inserted into the adapter shaft, and a clamping ring is placed on top of the adapter shaft, e.g., for the friction-locked connection of the adapter shaft to the motor shaft. This has the advantage that a simple connection is able to be achieved.

According to example embodiments, the bellows is welded both to the adapter shaft and to the input shaft, the adapter shaft, for example, having a radially protruding projection to which the bellows is connected by welding, the input shaft, for example, having a radially protruding projection to which the bellows is connected by welding. This offers the advantage that an integral connection and thus a strong connection may be used between the bellows and shafts.

According to example embodiments, the outer ring of a bearing, e.g., a roller bearing, a ball bearing, etc., is accommodated in a flange part, e.g., a bearing flange, of the gearing system, the inner ring of the bearing is placed on the input shaft, and the inner ring is positioned and/or pressed against the radially protruding projection provided on the input shaft. This has the advantage that the input shaft is mounted on the flange part and, moreover, the sun gear inserted into the first end of the input shaft is supported on planet wheels, and the adapter shaft thus is centered with the aid of the sealing ring when it is inserted into the input shaft. After the insertion and the friction-locked connection of the motor shaft, the sealing ring assumes a coupling function.

According to example embodiments, the bearing is axially set apart from the bellows. This offers the advantage that the sealing ring is situated in the region of the bellows such that an axial clearance from the bearing is provided. This allows for a better compensation of transverse forces.

According to example embodiments, the region covered by the bellows in the axial direction encompasses the region covered by the sealing ring in the axial direction and the region covered between the two steps in the axial direction. This has the advantage that the sealing ring centers the adapter shaft in the region of the bellows. Additionally, the length compensation takes place in the region that is covered by the bellows in the axial direction. The sun gear is therefore able to be operated separately from length changes of the motor shaft and the adapter shaft.

According to example embodiments, the region covered by the adapter shaft in the axial direction encompasses the region covered by the bellows in the axial direction. This offers the advantage that in the event of a malfunction of the sealing ring, the adapter shaft is deeply inserted in the input shaft, e.g., farther than the reach of the bellows. In such a fault case, the adapter shaft is retained at least in the stepped bore of the input shaft.

According to example embodiments, the sealing ring touches the step of the adapter shaft, the step of the input shaft, the wall of the stepped bore in the input shaft, and the cylindrical circumference of the adapter shaft.

This has the advantage that the sealing ring is restricted on four sides and thus effectively utilizes and simultaneously seals the spatial region. In the circumferential region, the spatial region accommodating the sealing ring has a circumferential configuration or in other words, is arranged without restriction.

According to example embodiments, the sealing ring touches the input shaft at the front in the axial direction, the adapter shaft counter to the axial direction, the input shaft in the radially outward-facing direction, and the adapter shaft in the radially inward-facing direction.

This offers the advantage that the sealing ring is restricted on four sides and thus effectively utilizes and simultaneously seals the spatial region. In the circumferential direction, the spatial region accommodating the sealing ring has a circumferential configuration or in other words, is arranged without restriction.

According to example embodiments, a housing part of the adapter is connected to the flange part and to a housing part of the gearing system, the housing part of the adapter is situated between the housing part of the gearing system and the flange part, and the housing part of the adapter radially surrounds the clamping ring. This offers the advantage that the adapter is situated between the motor and the gearing system. Changes in length between the motor and the gearing system can therefore be compensated.

According to example embodiments, the clamping ring has an axially uninterrupted slot, a screw, for example, being guided through the slot, for example, the, e.g., tangentially oriented screw compresses the clamping ring such that the slot becomes narrower. This has the advantage that a simple, friction-locked connection is obtained.

According to example embodiments, a sun gear arranged as a pinion is inserted into the input shaft on its side facing axially away from the adapter shaft and connected to the input shaft in a torsionally fixed manner. This has the advantage that a helically-toothed sun gear may be provided but thermally induced changes in length of the motor shaft have no effect on the circumferential angular position of the output shaft of the gearing system, and the sealing ring disposed between the adapter shaft and the input shaft seals the spatial region surrounded by the hollow adapter shaft against the input shaft, however, this spatial region is connected to the spatial region accommodating the bellow via a gap that is provided between the motor shaft and the adapter shaft. This is considered advantageous insofar as the sealing ring is used for aligning the adapter shaft relative to the input shaft. In addition, the sealing ring prevents the adapter shaft from knocking against the input shaft.

Further features and aspects of example embodiments of the present invention are described in greater detail below with reference to the appended schematic Figures.

DETAILED DESCRIPTION

Figure 1:
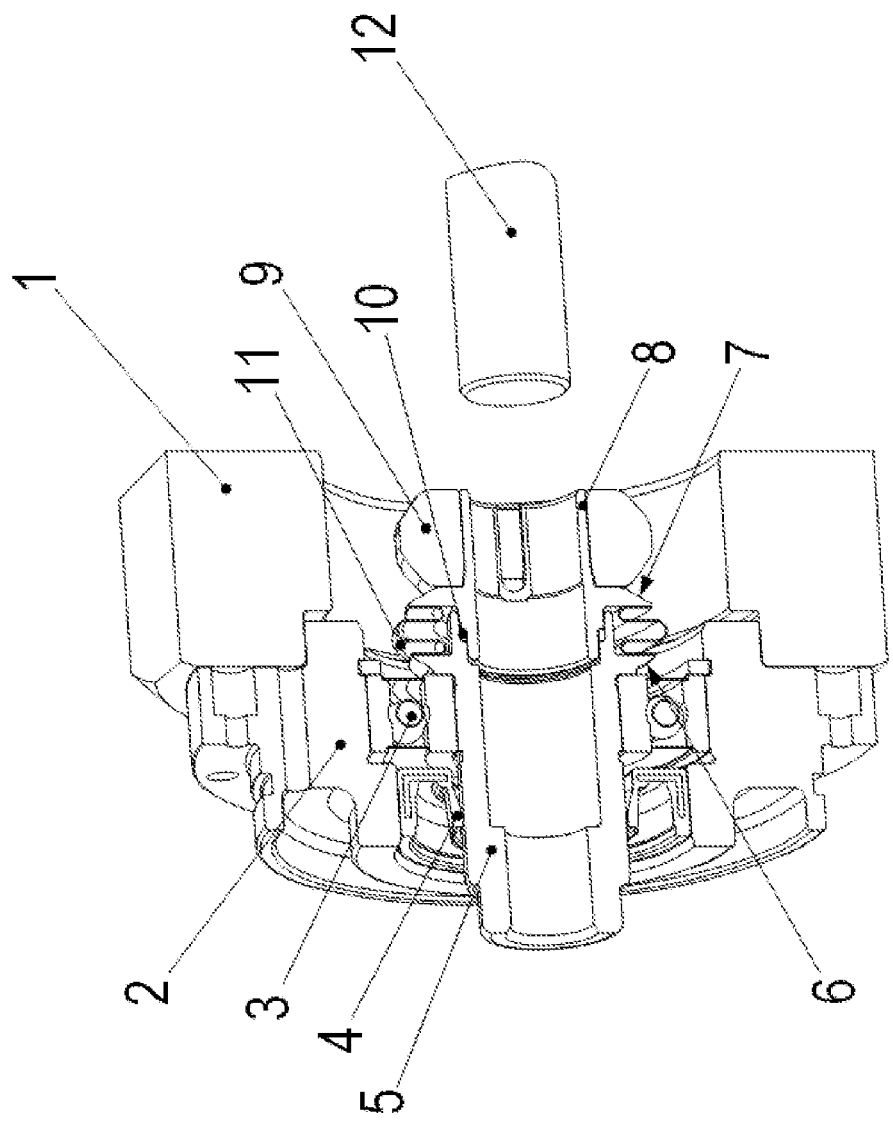
FIG. 1 illustrates the input region of a gearing system having an adapter included by a gear motor according to an example embodiment of the present invention.
Figure 2:
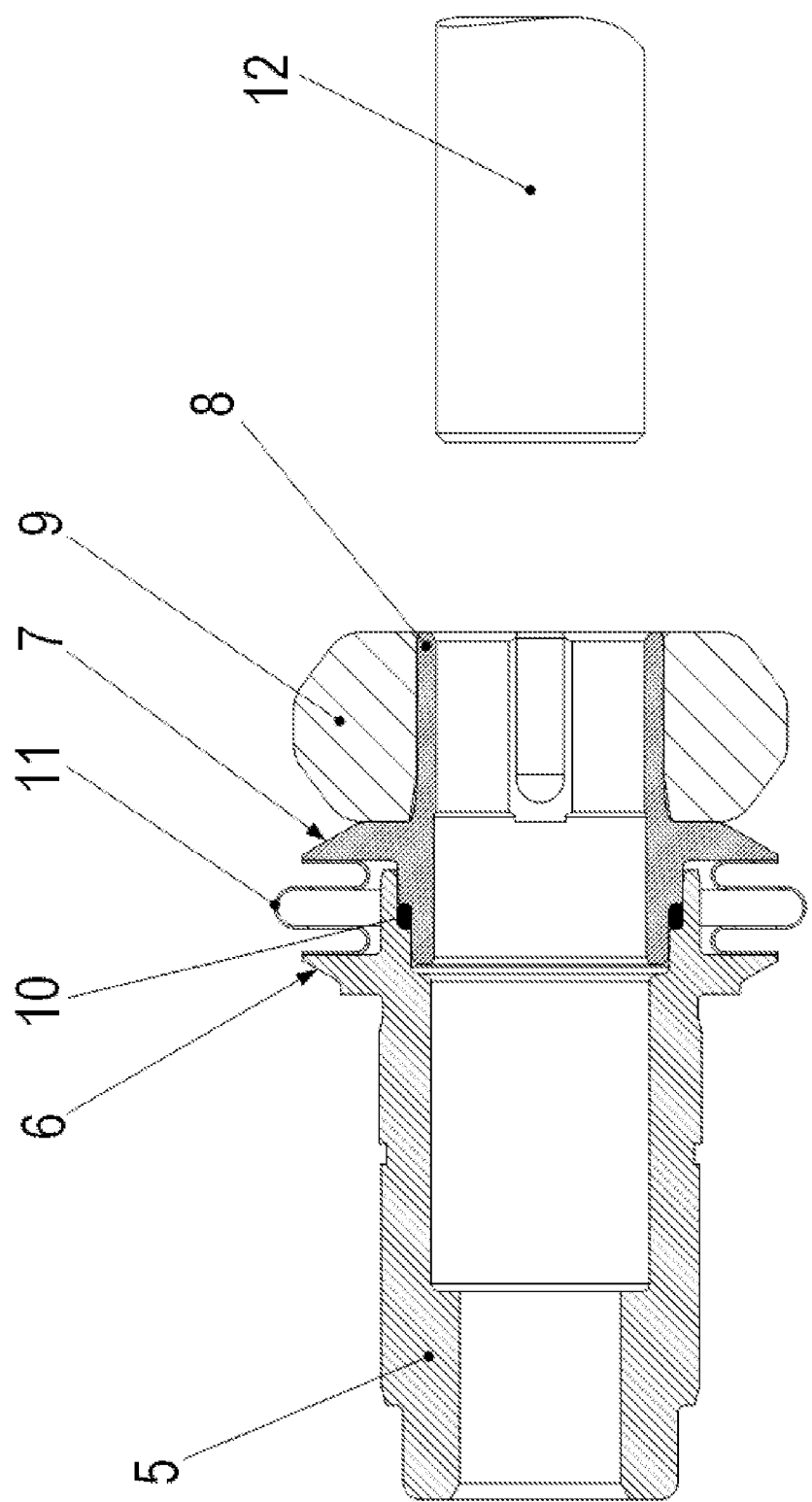
FIG. 2 is a longitudinal cross-sectional view through the rotating part illustrated in FIG. 1.
Figure 3:
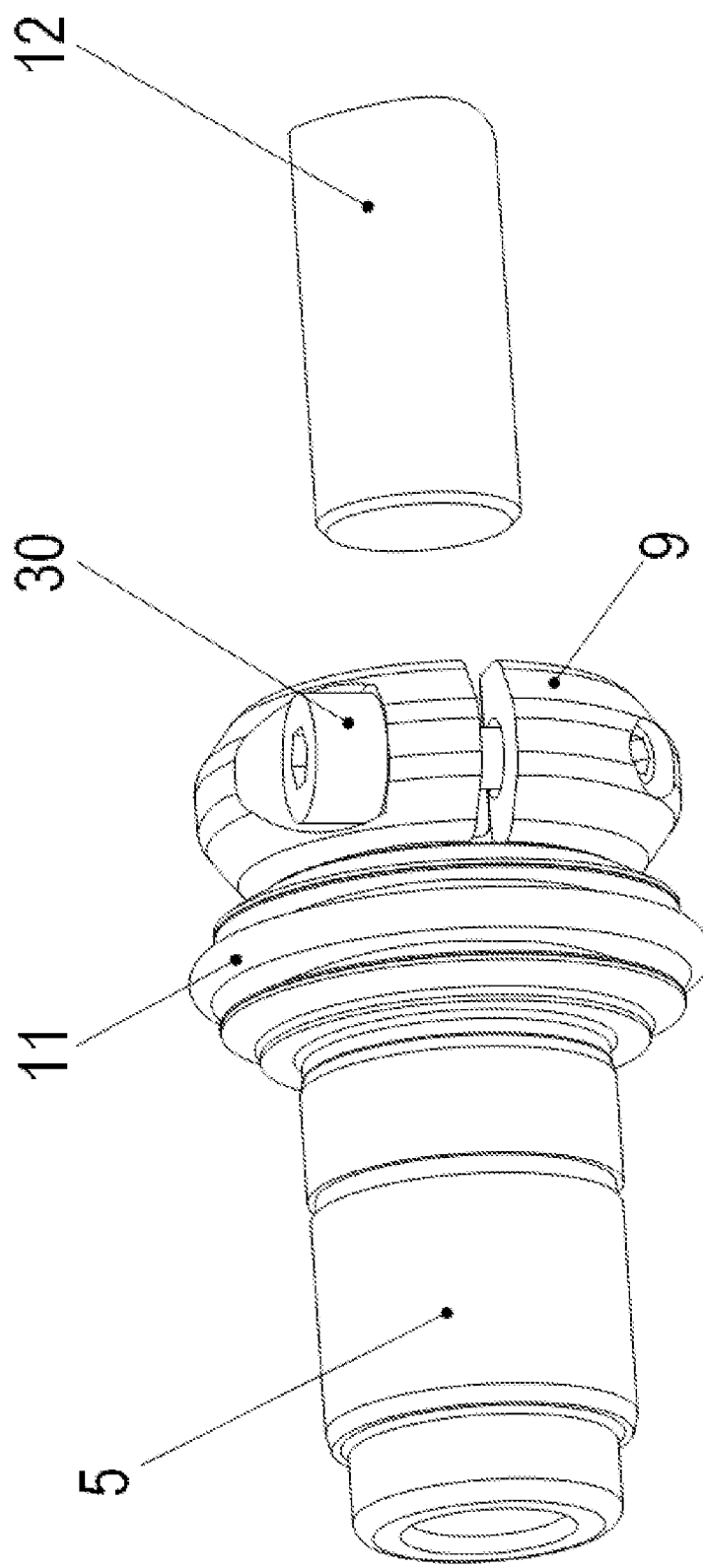
FIG. 3 is an associated perspective view.

As schematically illustrated in the Figures, the gear motor according to an example embodiment of the present invention has an adapter, which is situated between a gearing system and an electric motor.

The Figures show only motor shaft 12, i.e., especially the rotor, of the electric motor. With the aid of two bearings, motor shaft 12 is mounted inside the housing of the electric motor. The bearing facing the gearing system is, for example, a floating bearing, and the bearing situated at a greater distance is a fixed bearing.

Motor shaft 12 is inserted into a hollow adapter shaft 8 of the adapter and connected by friction locking. To this end, a clamping ring 9 is placed on adapter shaft 8, which shrink-fits the adapter shaft to inserted motor shaft 12 by operating the tangentially oriented screw 30. Adapter shaft 5 is provided with an axially directed slot for this purpose.

Input shaft 5 is also hollow and connected to adapter shaft 8 with the aid of a bellows 11 in a torsionally fixed manner. Bellows 11 is situated radially outside adapter shaft 8 and also radially outside input shaft 5. In other words, the radial clearance region covered by bellows 11 is radially outside the radial clearance region jointly covered by adapter shaft 8 and input shaft 5 in the region covered by bellows 11 in the axial direction.

Adapter shaft 8 is partially inserted into input shaft 5 of the gearing system. Input shaft 5 is rotatably mounted with the aid of a bearing 3, e.g., a roller bearing, a ball bearing, etc., accommodated in flange part 2. The inner ring of bearing 3 is placed on shaft 5, and the outer ring of bearing 5 is accommodated in flange part 2.

A shaft sealing ring 4, which seals against input shaft 5, is accommodated in flange part 2 on the side of bearing 3 axially facing away from bellows 11.

In the axial direction, i.e., especially in the direction of the axis of rotation of adapter shaft 8, bellows 11 is situated between a projection 7 formed on adapter shaft 8 and a projection 6 formed on input shaft 5. Via its first axial end region, bellows 11 is welded to projection 7, and via its other axial end region it is welded to projection 6.

The connection surfaces between bellows 11 and the projections 6, 7 are, e.g., flat, and the normals of the planes are aligned in parallel with the axial direction in each case.

The radial clearance region covered by the projections 6, 7 in each case overlaps with the radial clearance region covered by bellows 11.

In the region covered by bellows 11 in the axial direction, adapter shaft 8 has a step at its radial outer side, and input shaft 5 has a step on its inner side viewed from the radial direction.

The two steps are set apart from each other in the axial direction so that a sealing ring 10, e.g., an O-ring, is disposed between the steps.

The respective radial extension of the steps, i.e., for example, the radial clearance region covered by the respective step, is smaller than the diameter of the cross-section of the sealing ring in its relaxed state and/or smaller than the radial clearance region covered by the sealing ring in its relaxed state.

When adapter shaft 8 is inserted into input shaft 5, the sealing ring centers adapter shaft 8 relative to input shaft 5. This is relevant because input shaft 5 accommodates only the inner ring of a single bearing.

Bellows 11 compensates for thermally induced changes in length of motor shaft 12.

At the end region of input shaft 5 facing away from motor shaft 12, a sun gear, which is arranged as a pinion, is inserted into the hollow opening of shaft 5 and connected in a torsionally fixed manner and also firmly connected to input shaft 5 in the axial direction.

The sun gear, and also the planet wheels meshing with the sun gear, for example, have helical gearings, e.g., so that in a rigid coupling of adapter shaft 8 with input shaft 5, the axial, thermally induced length changes of motor shaft 12 result in a position accuracy of the output shaft via the helical gearing at the output shaft.

Sealing ring 10 induces centering of adapter shaft 8 relative to input shaft 5 when adapter shaft 8 is inserted into input shaft 5. In addition, it limits the insertion in that the further insertion requires an increasing, extremely strong force. Due to this rise in force, the insertion is restricted and/or the end of the insertion recognizable.

The spatial region accommodating sealing ring 10 in the axial direction and in the radial direction is, for example, so small that sealing ring 10 touches both the step of adapter shaft 8 and the step of input shaft 5 and also the wall of the bore in input shaft 5 as well as the cylindrical circumference of adapter shaft 8. Sealing ring 10 thus touches the two shafts 5, 8 that restrict it both in an axial direction at the front and back and radially outside and inside.

The region covered by sealing ring 10 in the axial direction is encompassed by the region covered by bellows 11 in the axial direction.

Bellows 11 is set apart from bearing 3 in the axial direction, and the inner ring of bearing 3 is pressed and/or positioned against projection 6 formed on input shaft 5. On the side of projection 6 facing axially away from bearing 3, bellows 11 is connected by welding.

The outer diameter of bellows 11 has a wave-shaped characteristic in the axial direction. The wall thickness of bellows 11, for example, is constant. Bellows 11, for example, is made from sheet metal.

Adapter shaft 8 is axially set apart from bearing 3. The region covered by adapter shaft 8 in the axial direction is set apart from the region covered by bearing 3 in the axial direction.

The region covered by adapter shaft 8 in the axial direction encompasses the region covered by bearing 3 in the axial direction.

The region covered by input shaft 5 in the axial direction is set apart from projection 7 provided on adapter shaft 8 to which bellows 11 is connected by welding.

The bearing is, for example, lubricated by grease.

Sealing ring 4 arranged as a shaft sealing ring seals the interior spatial region of the gearing system which is at least partially filled with oil. Thus, bellows 11 is surrounded not by oil but by ambient air. No seal is required between bellows 11 and the interior space of the driving motor.

Sealing ring 10 is, for example, arranged as an O-ring and used for centering adapter shaft 8 inside input shaft 5. In addition, it prevents abrasion between input shaft 5 and adapter shaft 8. The extremely narrow gap between adapter shaft 8 and input shaft 5 prevents or restricts a tilting angle. For example, only a relative movement of adapter shaft 8 with respect to input shaft 5 in the axial direction is possible as a result.

LIST OF REFERENCE NUMERALS

1 adapter housing part
2 flange part
3 bearing, e.g., roller bearing, ball bearing, etc.
4 sealing ring
5 input shaft
6 projection
7 projection
8 adapter shaft
9 clamping ring
10 sealing ring
11 bellows
12 motor shaft, e.g., rotor of the electric motor driving the gearing system
30 screw

The invention claimed is:

1. A gear motor, comprising:
   a gearing system including an input shaft;
   an electric motor;
   an adapter arranged between the electric motor and the gearing system and including an adapter shaft at least partially inserted into the input shaft of the gearing system and connected to the input shaft of the gearing system in a torsionally fixed manner with the aid of a bellows; and
   a sealing ring arranged between the adapter shaft and the input shaft;
   wherein the sealing ring touches the input shaft at a front in an axial direction, the adapter shaft counter to the axial direction, the input shaft in a radially outward-facing direction, and the adapter shaft in a radially inward-facing direction.

2. The gear motor according to claim 1, wherein the input shaft is integrally formed and/or formed as one part and/or the adapter shaft is integrally formed and/or formed as one part.

3. The gear motor according to claim 1, wherein the adapter shaft includes a step at an outer circumference, the input shaft has a stepped bore, and the sealing ring is arranged axially between the step of the adapter shaft and a step of the stepped bore.

4. The gear motor according to claim 3, wherein the sealing ring in particular is arranged on the adapter shaft.

5. The gear motor according to claim 3, wherein a region covered by the sealing ring in an axial direction and/or in a direction of an axis of rotation of the input shaft is encompassed by a region covered by the bellows in the axial direction.

6. The gear motor according to claim 1, wherein the adapter shaft has a hollow configuration, a motor shaft and/or a rotor of the electric motor is at least partially inserted into the adapter shaft, and a clamping ring is placed on the adapter shaft for a friction-locked connection of the adapter shaft to the motor shaft and/or the rotor.

7. The gear motor according to claim 6, wherein the clamping ring includes an axially uninterrupted slot.

8. The gear motor according to claim 7, wherein a screws is arranged through the slot and is arranged as a tangentially directed screw that compresses the clamping ring to narrow the slot.

9. The gear motor according to claim 1, wherein the bellows is welded to the adapter shaft and to the input shaft, the adapter shaft includes a radially protruding projection to which the bellows is connected by a weld, the input shaft including a radially protruding projection to which the bellows is connected by a weld.

10. The gear motor according to claim 1, wherein an outer ring of a bearing is accommodated in a flange part of the gearing system, an inner ring of the bearing is arranged on the input shaft, and the inner ring is positioned and/or pressed against a radially protruding projection arranged on the input shaft.

11. The gear motor according to claim 10, wherein the bearing is arranged as a roller bearing and/or a ball bearing, the flange part includes a bearing flange, a shaft sealing ring accommodated in the flange part seals against the input shaft, a sealing lip of the shaft sealing ring touches the input shaft, and the shaft sealing ring is arranged on a side of the bearing facing away from the bellows.

12. The gear motor according to claim 10, wherein the bearing is axially set apart from the bellows and is lubricated by grease.

13. The gear motor according to claim 10, wherein a housing part of the adapter is connected to the flange part and to a housing part of the gearing system, the housing part of the adapter is arranged between the housing part of the gearing system and the flange part, and the housing part of the adapter radially surrounds a clamping ring.

14. The gear motor according to claim 1, wherein a region covered by the bellows in an axial direction encompasses a region covered by the sealing ring in the axial direction and encompasses a region between two steps covered in the axial direction.

15. The gear motor according to claim 1, wherein a radial clearance region covered by the bellows is set apart from a radial clearance region covered by the sealing ring.

16. The gear motor according to claim 1, wherein a region covered by the adapter shaft in an axial direction encompasses a region covered by the bellows in the axial direction.

17. The gear motor according to claim 1, wherein the sealing ring touches a step of the adapter shaft, a step of the input shaft, a wall of a stepped bore in the input shaft, and a cylindrical circumference of the adapter shaft.

18. The gear motor according to claim 1, wherein a sun gear arranged as a pinion is arranged in the input shaft on a side facing axially away from the adapter shaft and connected to the input shaft in a torsionally fixed manner; and wherein (a) the input shaft is arranged as a hollow shaft and sealed with the aid of the sun gear against an interior space of the gearing system filled at least partially with oil or (b) the input shaft is arranged as a solid shaft.

19. The gear motor according to claim 18, wherein the sun gear meshes with planet wheels and/or planet gears.

20. The gear motor according to claim 18, wherein the sun gear includes a helical gearing that meshes with helical gearings of planet wheels and/or planet gears.

21. The gear motor according to claim 1, the sealing ring is arranged as an O-ring and/or is formed of an elastomer and/or rubber.

22. The gear motor according to claim 1, wherein the adapter shaft is arranged as a hollow adapter shaft, and the sealing ring is arranged between the hollow adapter shaft and the input shaft to seal a spatial region surrounded by the hollow adapter shaft against the input shaft, the spatial region surrounded by the hollow adapter shaft against the input shaft being connected to a spatial region accommodating the bellows via a gap that is provided between a motor shaft and the adapter shaft.

23. A gear motor, comprising:
a gearing system including an input shaft;
an electric motor;
an adapter arranged between the electric motor and the gearing system and including an adapter shaft at least partially inserted into the input shaft of the gearing system and connected to the input shaft of the gearing system in a torsionally fixed manner with the aid of a bellows; and
a sealing ring arranged between the adapter shaft and the input shaft;
wherein the sealing ring touches a step of the adapter shaft, a step of the input shaft, a wall of a stepped bore in the input shaft, and a cylindrical circumference of the adapter shaft.

* * * * *